United States Patent [19] [11] Patent Number: 4,613,520
Dasgupta [45] Date of Patent: Sep. 23, 1986

[54] COATING COMPOSITIONS

[75] Inventor: Sunil P. Dasgupta, Wilmington, Del.

[73] Assignee: Hercules Incorporated, Wilmington, Del.

[21] Appl. No.: 695,789

[22] Filed: Jan. 25, 1985

Related U.S. Application Data

[62] Division of Ser. No. 513,877, Jul. 14, 1983, Pat. No. 4,505,990.

[51] Int. Cl.$^4$ .................. B05D 5/12; C01G 49/08
[52] U.S. Cl. .................. 427/128; 252/62.54; 252/62.56; 252/513; 524/910; 524/911; 428/694
[58] Field of Search .................. 524/910–913; 428/694; 252/511, 513, 62.54, 62.56; 427/128

[56] References Cited

U.S. PATENT DOCUMENTS

| | | | |
|---|---|---|---|
| 3,365,437 | 1/1968 | Marra et al. | 260/94.9 |
| 3,629,310 | 12/1971 | Baily et al. | 525/403 |
| 3,754,924 | 8/1973 | De Geest et al. | |
| 4,049,861 | 9/1977 | Nozari | 428/220 |
| 4,213,870 | 7/1980 | Loran | 252/51.5 R |
| 4,313,978 | 2/1982 | Stevens et al. | 524/913 |
| 4,505,990 | 3/1985 | Dasgupta | 428/694 |

FOREIGN PATENT DOCUMENTS

| | | |
|---|---|---|
| 742680 | 9/1973 | Belgium . |
| 54-147811 | 11/1979 | Japan . |
| 56-53148 | 5/1981 | Japan . |
| 57-154640 | 9/1982 | Japan . |
| 57-154647 | 9/1982 | Japan . |
| 57-191831 | 11/1982 | Japan . |
| 57-198541 | 12/1982 | Japan . |
| 57-200939 | 12/1982 | Japan . |
| 57-200940 | 12/1982 | Japan . |

OTHER PUBLICATIONS

Chem. Abst., vol. 76:160792g, Geest 1971.

*Primary Examiner*—Theodore Morris
*Attorney, Agent, or Firm*—Joanne W. Patterson; Hazel L. Deming

[57] ABSTRACT

Described are coating compositions having improved antistatic properties and particularly magnetic coating compositions suitable for magnetic recording media. The compositions comprise at least one film-forming synthetic resin and, based on coating solids, from about 0.2 to about 10% of an alkali, alkaline earth, ammonium or amine salt of a perfluoroalkyl sulfonic acid or carboxylic acid.

9 Claims, No Drawings

COATING COMPOSITIONS

This application is a division of application Ser. No. 513,877, filed July 14, 1983 U.S. Pat. No. 4,505,990.

This invention relates to coating compositions suitable for application to plastic articles such as sheets or films to reduce their tendency to accumulate static electrical charges, to plastic articles coated with the compositions and particularly to magnetic recording media having the antistatic coating thereon. The invention also relates to magnetic particles adapted to provide magnetic recording media having improved electrical resistivity and to magnetic recording media having a magnetic layer characterized by low electrical resistivity.

The accumulation of electrostatic charges or static build-up has long been one of the more annoying problems associated with the plastics art. Electrostatic charging is disadvantageous for many applications and is particularly troublesome with films and fibers due to their tendency to attract dust and dirt particles. Further, when the films are used as supports or carrier sheets for other materials and particularly magnetic layers for the formation of magnetic tapes or discs, static charges are induced by friction when the magnetic tape is running and result in the generation of noise, distortion of signal, dropout of signal upon reproduction and non-uniform tape speed.

Approaches which have been suggested for providing antistatic protection for plastic articles include incorporating an antistatic agent directly into the plastic prior to its fabrication into a shaped article or applying an antistatic agent or coating to the surface of an already molded or shaped article. The approaches which are described as being particularly useful for reducing the surface resistivity of magnetic recording media include adding a conductive material, usually carbon black, to the magnetic layer, to the carrier strip, to a separate layer positioned between the carrier strip and the magnetic layer or to a separate layer applied as a backing to the carrier strip. See for example, U.S. Pat. Nos. 3,440,091; 4,189,514; 4,275,113; and 4,310,599. The amount of carbon black required to provide magnetic layers having satisfactory electrical conductivity adversely interferes with the dispersibility characteristics of the magnetic particles, and affects tape quality by causing a decrease in output level, an increase in surface noise and a reduction in high frequency sensitivity.

More recently it has been suggested in U.S. Pat. No. 4,379,803 that magnetic recording medium having good antistatic properties without the disadvantages associated with the use of carbon black as the conductive material can be obtained by incorporating a small amount of a Group VIII metal phosphide in the magnetic layer. Use of a metal phosphide such as iron phosphide results in a moderate reduction in electrical resistance but does not provide the low resistance values sought by industry.

A slightly different approach is discussed in U.S. Pat. No. 4,069,367 and involves depositing an alloy of cobalt with copper, zinc, vanadium, manganese, molybdenum, nickel and/or iron directly onto the surface of particles of magnetic iron oxides to obtain a magnetic material having high coercivity, high magnetic flux density and low electrical resistance. Although the alloy coated iron oxide particles of U.S. Pat. No. 4,069,367 provide magnetic tapes having lower electrical resistance than uncoated iron oxide particles, the problems and expense associated with coating the oxide particles and using alloy coated particles make this route economically unattractive.

Now, in accordance with the present invention, it has been found that the above disadvantages can be avoided and that magnetic recording media having good antistatic properties without sacrifice of the desirable properties of the recording media can be obtained by incorporating a small amount of an ionic salt of a perfluoroalkyl sulfonic acid or of a perfluoroalkyl carboxylic acid in the magnetic layer or a separate coating applied to the surface of the recording media.

Accordingly, the present invention relates to an antistatic coating composition comprising a film-forming synthetic resin component and from about 0.2 to about 10% based on coating solids of an alkali or alkaline earth metal, ammonium or amine salt of a perfluoroalkyl sulfonic acid or carboxylic acid, a process for applying the composition to the surface of a plastic article and to plastic articles coated with the composition. The invention also relates to a magnetic composition suitable for magnetic recording media comprising magnetic particles and from about 0.2 to about 10% based on the weight of the particles of an alkali or alkaline earth metal, ammonium or amine salt of a perfluoroalkyl sulfonic acid or carboxylic acid, a process for producing the magnetic composition and to magnetic recording medium comprising a substrate coated with a magnetic layer comprising the magnetic composition and a synthetic resin binder.

The salts of perfluoroalkyl sulfonic acids or of perfluoroalkyl carboxylic acids used in accordance with this invention can be any ionic salt of a metal or an ammonium or amine salt. The preferred metal salts are salts of an alkali metal or an alkaline earth metal, with sodium, lithium, potassium, and magnesium being particularly preferred. The perfluoroalkyl sulfonic acids or carboxylic acids which, in the form of their salts, are particularly useful have the formula $CF_3(CF_2)_nSO_3H$ or $CF_3(CF_2)_nCOOH$ where n is 0 to 5. Salts of perfluoroalkyl sulfonic acids or carboxylic acids wherein the alkyl group contains 1 to 6 or more carbon atoms are commercially available from the 3M Company under the trade designation "Fluorad". Particularly preferred are the lithium salts of trifluoromethane sulfonic acid and trifluoroacetic acid.

The salts are soluble or readily dispersible in conventional film forming coating formulations and can be used in non-aqueous or aqueous solvent systems. In a preferred embodiment of the invention wherein the coating formulation contains large amounts, usually from about 60 to about 85% by weight based on total solids of magnetic particles dispersed in a binder material, the salt can be added directly to the formulation or, if desired, can be blended in advance with the magnetic particles to provide surface-treated particles. The amount of salt required to provide coatings of satisfactory electrical surface resistance will vary depending upon the particular salt used and the components of the coating formulation and particularly the type and amount of solids present. In general, from about 0.2 to about 10 weight % based on total solids will provide essentially static free pigmented or unpigmented coatings without detriment to any of the desirable properties of the coatings. Larger amounts can, of course, be used if desired. However, since amounts greater than about 10% have not been found to provide additional improvement, the presence of amounts substantially in excess of about 10% is not economical and hence not recommended. Usually, the presence of from about 0.5 to about 10%, and preferably from 0.5 to 7% of the salt based on the weight of magnetic particles will provide magnetic recording media having surface resistivity values below about $1 \times 10^{10}$ ohms/square, which values are usually considered acceptable to magnetic tape manufacturers.

In the preferred embodiment of the invention which is a magnetic recording medium such as a magnetic tape or disc, a base or substrate which is usually a film of poly(vinyl chloride), polyethylene, polypropylene, polyamide, polyester or the like is coated with a magnetic layer comprising magnetic particles, a binder resin and a sufficient amount of the above salts to provide static resistance. The magnetic particles can be any of the known oxides or metals conventionally used in magnetic recording systems. The preferred particles are acicular iron oxide particles such as $\gamma$-$Fe_2O_3$, Co-containing $\gamma$-$Fe_2O_3$, $Fe_3O_4$, Co-containing $Fe_3O_4$, $CrO_2$ particles, particles of metals such as iron, cobalt, nickel or their alloys and the like.

The binder resin can be any film-forming polymer compatible with the base film and preferably is poly(vinyl chloride), vinyl chloride/vinyl acetate copolymer, vinyl chloride/vinyl acetate/vinyl alcohol terpolymer, urethane resin, epoxy resin, phenoxy resin, polyether resin, cellulose ester such as cellulose nitrate, and the like. The most preferred binders are mixtures of thermoplastic polyurethanes with vinyl chloride copolymers or terpolymers.

Other ingredients such as for example dispersing agents, emulsifying agents, lubricants, antioxidants, plasticizers, cross-linking agents, adhesion promoters and the like conventionally used in coatings and particularly magnetic coatings can be present if desired, provided, of course, that their presence and the amount used do not detract from the advantages of the invention.

The invention is further illustrated by the following examples which demonstrate the best known embodiments of the invention. In the examples, all parts and percentages are by weight unless otherwise indicated.

EXAMPLE 1

Five coating compositions were prepared by dispersing in a quickee mill for 1.4 hours the ingredients listed below, the vinyl copolymer solution being added after 15 minutes of milling time and the polyurethane solution after 1 hour of milling time.

TABLE 1

| Ingredients | Parts |
| --- | --- |
| $\gamma$-$Fe_2O_3$[1] | 100 |
| Toluene | 37.5 |
| Cyclohexanone | 4.0 |
| Lithium salt of trifluoromethane sulfonic acid | 0.5–3.0 |
| anionic phosphate ester dispersing agent | 3.6 |
| Isocetyl stearate | 0.6 |
| Lecithin | 0.4 |
| 20% solution of a copolymer of vinyl chloride-acetate-alcohol in toluene:cyclohexanone (5:3) | 12.8 |
| 15% solution of prepolymerized polyurethane in tetrahydrofuran | 108.8 |

TABLE 1-continued

| Ingredients | Parts |
| --- | --- |

[1] acicular particles having an average length of 0.4 micron, a length to width ratio of 7 to 1, a specific surface area by BET of 25 m²/gram and a coercivity of 360 oersteds at a field strength of 3000 oersteds.

Each composition was applied as a coating to one surface of polyethylene terephthalate film having a thickness of 0.02 mm by hand draw-down through a knife edge, and the coated film was dried for 24 hours at room temperature, giving a coating thickness of 0.01–0.03 mm. The resulting coated films, A–E and a reference film were stored at 23° C. and 50% relative humidity for 5 days and then tested for surface resistivity according to ASTM Standard Test Procedure D-257-78. The reference film was prepared in the same manner as the films of this example except that the lithium salt of trifluoromethane sulfonic acid was omitted from the coating composition. The test results are set forth in Table 2, below.

TABLE 2

| Coated Film | Amount of Lithium Salt[1] | Surface Resistivity (ohms/square) |
| --- | --- | --- |
| A | 0.5 | $1.3 \times 10^{10}$ |
| B | 1.0 | $3.7 \times 10^{9}$ |
| C | 1.5 | $1.9 \times 10^{9}$ |
| D | 2.0 | $7.8 \times 10^{8}$ |
| E | 3.0 | $3.7 \times 10^{8}$ |
| Reference | — | $2.8 \times 10^{11}$ |

[1] weight % based on $\gamma$-$Fe_2O_3$

For the sake of comparison three control coating compositions were also prepared according to this example with the exception that 0.5, 1.0 and 1.5 parts of a commercial antistatic agent determined to be the sodium salt of a sulfonated aliphatic hydrocarbon containing an average of 15 carbon atoms were substituted for an equal amount of the lithium salt of trifluoromethane sulfonic acid. When the control compositions were applied to polyethylene terephthalate film, dried to form coated film and tested, as above, all three control films had a surface resistivity value of about $1.1 \times 10^{11}$ ohms/square.

EXAMPLE 2

A coating composition was prepared and applied to film according to the procedure of Example 1 except that the $\gamma$-$Fe_2O_3$ particles had an average length of 0.55 micron, a length to width ratio of 6 to 1, a specific surface area by BET of 24 m²/gram and a coercivity of 395 oersteds, and 1.0 part of the lithium salt was used. The resulting film and a reference film (prepared in the manner of this example except that the lithium salt was omitted) were tested for surface resistivity following exposure to various test conditions as set forth in Table 3. The results of the tests are tabulated below.

TABLE 3

| | Surface Resistivity (ohms/square) | |
| --- | --- | --- |
| Test Conditions | Film of Ex. 2 | Reference Film |
| 23° C./50% R.H./5 days | $1.3 \times 10^{9}$ | $2.4 \times 10^{11}$ |
| 50° C./12 hrs | $5.4 \times 10^{9}$ | $1.7 \times 10^{12}$ |
| 23° C./80% R.H./72 hrs | $1.5 \times 10^{9}$ | $1.2 \times 10^{11}$ |

EXAMPLE 3

A coating composition was prepared according to the procedure of Example 1 except that the amount of lithium salt was 1.0 part and the $\gamma$-$Fe_2O_3$ particles and the lithium salt were preblended for 10 minutes in a paddle blender prior to carrying out the dispersion in the ball mill. Coated film prepared from the composition of this example gave a room temperature surface resistivity value of $2.6 \times 10^9$ ohms/square as compared with $3.9 \times 10^{11}$ ohms/square for the reference film.

EXAMPLES 4 AND 5

Coating compositions were prepared according to the procedure of Example 1 except that various salts were substituted for the lithium salt of trifluoromethane sulfonic acid, the amount of salt in each instance being 1% (on a 100% solids basis), based on the amount of $\gamma$-$Fe_2O_3$. The salts used and the test results on the coated films prepared with the compositions are reported in Table 4, below.

TABLE 4

| Ex. No. | Salt | Resistivity (ohms/square) 23° C./50% R.H./5 days | 50° C./12 hrs. |
| --- | --- | --- | --- |
| 4 | diethylamine trifluoromethane sulfonate[1] | $4.6 \times 10^{9[2]}$ | $6.7 \times 10^9$ |
| 5 | lithium trifluoroacetate | $9.4 \times 10^9$ | $3.1 \times 10^{10}$ |
| Reference | — | $3.9 \times 10^{11}$ | — |

[1] added as a 60% solution in water/diethylene glycol monoethyl ether
[2] average of two trials

EXAMPLE 6

A coating composition was prepared according to the procedure of Examples 4 and 5 except that the salt used was the magnesium salt of trifluoromethane sulfonic acid. The resulting film gave a room temperature surface resistivity value of $2.8 \times 10^{10}$ ohms/square as compared with $1.1 \times 10^{12}$ ohms/square for the reference film.

EXAMPLES 7 TO 10

A vinyl modified polyurethane coating formulation was prepared by mixing 136 parts of a 20% solution of a copolymer of vinyl chloride-acetate-alcohol (91:3:6) in toluene:cyclohexanone (5:3) with 1150 parts of a 15% solution of prepolymerized polyurethane in tetrahydrofuran. Various amounts of the lithium salt of trifluormethane sulfonic acid ranging from 1.5% to 5.5% based on polymer solids were added to separate portions of the formulation and the resulting compositions were applied as coatings to one surface of polyethylene terephthalate film having a thickness of 0.2 mm by hand draw-down through a knife edge and the coated film was dried for 24 hours at 25° C., giving a coating thickness of 0.01 to 0.03 mm. The coated films and a reference film (prepared in the same manner as the coated films of this example except that the lithium salt was omitted) were tested for surface resistivity according to the procedure of Example 1. Details of these examples and the test results are set forth in Table 5 below.

TABLE 5

| Ex. No. | Amount of Lithium Salt (%)[1] | Surface Resistivity (ohms/square) |
| --- | --- | --- |
| 7 | 1.5 | $1.0 \times 10^{10}$ |
| 8 | 2.4 | $5.0 \times 10^9$ |
| 9 | 3.4 | $3.0 \times 10^9$ |
| 10 | 5.4 | $1.5 \times 10^9$ |
| Reference | — | $4.0 \times 10^{12}$ |

[1] based on polymer solids

EXAMPLE 11

A laboratory blender was charged with 4500 parts of the $\gamma$-$Fe_2O_3$ particles of Example 1 and 450 parts of a 10% aqueous solution of the lithium salt of trifluoromethane sulfonic acid were added to the blender at a constant rate over a 10 minute period, after which time the blended charge was dried at 60°–70° C. for 24 hours to a moisture content less than 0.5%.

The dried product was used to form a magnetic coating composition which was applied to one surface of 0.02 mm polyethylene terephthalate film by hand drawdown through a knife edge and the coated film was dried to give a magnetic tape. The coating composition was prepared using the ingredients and procedure of Example 1 except that 101 parts of the dried product were substituted for the 100 parts of $\gamma$-$Fe_2O_3$ particles and the separate addition of the lithium salt of trifluoromethane sulfonic acid was omitted. The resulting tape gave a room temperature surface resistivity value of $1.5 \times 10^9$ ohms/square as compared with a value of $3.9 \times 10^{11}$ ohms/square for the reference tape from the untreated starting $\gamma$-$Fe_2O_3$ particles.

EXAMPLE 12

A magnetic tape was also produced by applying the magnetic coating composition of Example 11 to a support film having a thickness of 0.01 mm in a pilot plant facility. The resulting tape gave a surface resistivity value of $6.7 \times 10^9$ ohms/square as compared with a value of $1.9 \times 10^{12}$ ohms/square for the reference tape. The efficiency of the tape to inhibit static generation was also evaluated by passing a 10–12 inch sample of tape back and forth using a 10 to 15 second cycle in frictional contact with an aluminum surface for 2 to 3 minutes and then measuring the charge built up on the tape surface. The tape made from the magnetic coating composition of this example did not exhibit any charge generation whereas the reference tape gave 0.2 kilovolts/percentimeter.

EXAMPLE 13

A magnetic coating composition having a Brookfield viscosity of 8000 to 10,000 cps (No. 3 spindle, 10 rpm) was prepared according to the procedure of Example 3. The coating was applied to the surface of polyethylene terephthalate film having a thickness of 0.012 mm using a reverse roll coater at a coating speed of 200–250 ft/min, and the coated film was dried, giving a coating thickness of about 4 microns.

A portion of the coated film was calendered at 8000 psi pressure, a temperature of 71° C. and a film speed of 150 ft/min to obtain blank cassette tape. Another portion of the coated film was 3-roll calendered at 4800 psi pressure, a temperature of 60° C. and a film speed of 300 ft/min to obtain duplicator tape. The magnetic and audio properties of the blank cassette and duplicator tapes were measured and are reported in Table 6 along with the properties of reference tapes prepared in the same manner except that non-blended γ-Fe₂O₃ particles were used and the coating composition did not contain the lithium salt of trifluoromethane sulfonic acid.

TABLE 6

| Property | Blank Cassette Tape | | Duplicator Tape | |
| --- | --- | --- | --- | --- |
| | Example | Reference | Example | Reference |
| Coercivity,[1] oersteds | 357 | 359 | 359 | 360 |
| Squareness[1] | 0.85 | 0.85 | 0.85 | 0.85 |
| Orientation Ratio[2] | 2.7 | 2.7 | 2.9 | 2.9 |
| Sensitivity,[3] decibels | | | | |
| 315 Hz | −0.5 | −0.5 | −0.4 | −0.8 |
| 12.5 K Hz | −1.3 | −1.2 | −1.4 | −1.3 |

[1]Using a BH Meter and a field strength of 3000 oersteds
[2]Using a vibrating sample magnetometer and a field strength of 10,000 oersteds
[3]I.E.C. Standard From the results shown in the above table, it can be seen that the inclusion of the lithium salt of trifluoromethane sulfonic acid in a magnetic coating composition used to form magnetic recording tape does not effect the audio and magnetic properties of the resulting tape and that recording media of high quality can be obtained by the practice of this invention.

What I claim and desire to protect by Letters Patent is:

1. An antistatic coating composition comprising a film-forming synthetic resin component, a solvent or solvent system for the resin component, acicular particles of magnetic iron oxide and as the sole antistatic agent, from about 0.2 to about 10% based on coating solids of an alkali or alkaline earth metal, ammonium or amine salt of a perfluoroalkyl sulfonic acid or carboxylic acid having the formula $CF_3(CF_2)_nSO_3H$ or $CF_3(CF_2)_nCOOH$ where n is 0 to 5.

2. A process for reducing the surface electrical resistivity of a polypropylene or polyethylene terephthalate sheet or film normally subject to static build-up, which process comprises applying to at least one surface of said sheet or film the coating composition of claim 1 and removing the solvent from the composition to form a dry magnetic layer on the surface of the sheet or film.

3. The composition of claim 1 wherein the salt is a lithium salt.

4. The composition of claim 3 wherein the salt is the lithium salt of trifluoromethane sulfonic acid.

5. A plastic article having reduced surface electrical resistivity, said article comprising a plastic substrate having on at least one of its surfaces a coating layer derived from the composition of claim 3.

6. The plastic article of claim 5 wherein the substrate is a sheet or film of polypropylene or polyethylene terephthalate.

7. The composition of claim 3 wherein the salt is the lithium salt of trifluoroacetic acid.

8. The composition of claim 1 wherein the salt is diethylamine trifluoromethane sulfonate.

9. The composition of claim 1 wherein the salt is the magnesium salt of trifluoromethane sulfonic acid.

* * * * *